United States Patent
Kasper et al.

(10) Patent No.: US 7,801,754 B2
(45) Date of Patent: Sep. 21, 2010

(54) SYSTEMS, METHODS AND COMPUTER-IMPLEMENTED ARCHITECTURES FOR PERFORMING SUPPLY CHAIN PLANNING

(75) Inventors: Thomas Kasper, Wiesloch (DE); Mathias Goebelt, Heidelberg (DE); Andreas Sandner, Altlussheim (DE)

(73) Assignee: SAP AG, Walldorf (DE)

( * ) Notice: Subject to any disclaimer, the term of this patent is extended or adjusted under 35 U.S.C. 154(b) by 1301 days.

(21) Appl. No.: 11/319,366

(22) Filed: Dec. 29, 2005

(65) Prior Publication Data

US 2006/0155593 A1    Jul. 13, 2006

(30) Foreign Application Priority Data

Dec. 29, 2004    (EP) .................................. 04030962

(51) Int. Cl.
    *G06F 17/50*    (2006.01)
(52) U.S. Cl. ........................................................ 705/7
(58) Field of Classification Search ................ 705/7
    See application file for complete search history.

(56) References Cited

U.S. PATENT DOCUMENTS

| 5,557,367 A | * | 9/1996 | Yang et al. ..................... 399/14 |
| 6,086,617 A | * | 7/2000 | Waldon et al. .................. 703/2 |
| 6,411,922 B1 | * | 6/2002 | Clark et al. ..................... 703/2 |

OTHER PUBLICATIONS

Raghunathan, Srinivasan. An application of qualitative reasoning to derive behavior from structure of quantitative models. Journal of Management Information Systems. JMIS; v11n1; pp. 73-100 Summer 1994.*
Pavilion Receives Defendant Pegasus Technologies Inc.'s Response to Pavilion's Patent Infringement Case. Business Wire, p. 0555 Oct. 31, 2000.*
M. W. P. Savelsbergh, "Preprocessing and Probing Techniques for Mixed Integer Programming Problems," ORSA Journal on Computing, vol. 6, No. 4, Fall 1994, pp. 445-454.
Karla L. Hoffman et al., "Improving LP-Representations of Zero-One Linear Programs for Branch-and-Cut," ORSA Journal on Computing, vol. 3, No. 2, Spring 1991, pp. 121-134.

* cited by examiner

*Primary Examiner*—Johnna R Loftis
(74) *Attorney, Agent, or Firm*—Finnegan, Henderson, Farabow, Garrett & Dunner, LLP

(57) ABSTRACT

Methods, systems and computer-implemented architectures are provided for performing supply chain planning. In one implementation, a system is provided that comprises a database configured to store master data descriptive of supply chain items, a model generator coupled to the database and configured to derive a master data-based core model representative of a supply chain planning problem, and a solver configured to translate the core model into a mathematical model and determine a solution to the mathematical model. In addition, the system may comprise a preprocessor configured to preprocess the core model by subjecting the core model to a set of rules to derive a preprocessed core model, wherein the solver establishes the mathematical model from the preprocessed core model. By applying a set of preprocessing rules to the core model, where the business logic of the supply chain planning problem still exists, the solving process of the planning problem can be improved and the performance of the solver can be enhanced. Moreover, meaningful results obtained from the preprocessing can be reported to a customer.

20 Claims, 4 Drawing Sheets

Supplier L1                  L2

L1                  Customer L2

SYSTEMS, METHODS AND COMPUTER-IMPLEMENTED ARCHITECTURES FOR PERFORMING SUPPLY CHAIN PLANNING

TECHNICAL FIELD

The present invention generally relates to the field of data processing and computer-supported supply chain planning. More specifically, the invention relates to methods, systems and computer-implemented architectures for optimizing supply chain planning problems.

BACKGROUND INFORMATION

Planning a supply chain has become a highly complex task in modern industries. A complete supply chain may cover all supply network areas from a supplier's supplier to a customers customer. A complete supply chain may be modelled, for example, from master data such as locations, products, resources, bills of material, etc. and from data representing transport relations.

A resource may be defined, for example, as referring to a machine, person, facility, warehouse, means of transportation or other asset with a limited capacity that fulfils a particular function in the supply chain. A resource's capacity may be defined, for example, by a quantity (e.g., transport or warehouse capacity) or a per-time rate (e.g., production rate per day or week).

A location may be defined, for example, as referring to a place or organizational entity at which quantities of products or resources are managed. Exemplary locations include a production plant, a distribution center, a transportation zone, a stock transfer point, a storage location area, a customer, a vendor (external supplier), a subcontractor, a transportation service provider, a terminal, a geographical area, and a store.

A product may be defined, for example, as referring to a good that is the subject of business activity. A product can be used, consumed or created in the course of a production process. Thus, a product can be any of a raw product, an intermediate product and a final product. A location-product may then be defined by assigning a product to a specific location in a supply chain model. Similarly, a lane-product may be defined by assigning a product to a lane of transportation in a supply chain model.

A bill of material may be defined, for example, as referring to a complete, structured list of the components that make up an object.

Automated supply chain solutions are available in the marketplace and provide various features. For example, SAP AG's presently marketed software solution for planning and controlling the entire supply chain, Advanced Planner and Optimizer (APO), defines production process model (PPM), operation, and activity as further master data. A production process model describes when a plan can be used to manufacture a product. It brings together a bill of material and a work plan or task list and allows to determine at which production facility in what quantity and in what manner a product can be manufactured at a particular time. A production process model will include at least one operation which, in turn, will contain at least one activity. An operation describes an action within a PPM plan and oftentimes consists of numerous activities. An activity thus represents a separate step within an operation. For example, the operation drilling may consist of the following activities: setting up a drill, operating the drill, and tearing down the drill.

It is to be understood that the above-described types of master data are merely exemplary and non-limiting. A person of ordinary skill in the art will readily appreciate that other types of master data are conceivable as well and that the particular application may determine the types of master data to be used.

Supply chain planning frequently involves different types of planning that allow to plan and optimize different aspects of the supply chain. For example, supply network planning may allow to create a plan that describes the product flow along the supply chain so that all the demand requirements can be met. Production planning may allow the planner to create feasible production plans across different production locations to fulfil a demand in time and to the standard expected by the customer. Transportation planning may allow to create a least cost transportation plan while guaranteeing customer service. Other types of planning may exist as well and be implemented in a supply chain planning system.

Supply chain planning problems oftentimes can be formulated as finding a minimum (or maximum) value for an objective function while observing a number of constraints. A typical objective function relates to the overall costs of the production or transportation plan. It can be said that it is a general goal to keep costs as low as possible. Time can also be the subject of an objective function (as, e.g., in the case of having to find a least time consuming plan for transporting goods). Constraints can be imposed, for example, by required safety stocks, the maximum capacity of resources, time requirements, etc.

For finding a solution to a supply chain planning problem, it is a common approach to develop a mathematical representation of the problem and solve the mathematical problem using optimization techniques. A great many of supply chain planning problems can be formulated by a linear objective function and linear equalities or inequalities representing the constraints. Such problems are frequently referred to as linear programming (LP) problems. In practical scenarios, the LP representation of a supply chain planning problem may easily contain several hundred thousand variables or even more than that. If the variables are integer variables, i.e., they can only assume integer values such as a binary value, the problem is called an integer LP problem. In many cases, however, a supply chain planning problem will not only involve integer variables, but variables that may assume non-integer values. The problem is then called a mixed integer linear programming (MILP) problem.

Numerous algorithms have been developed in the art for solving LP problems, including the Simplex algorithm and branch-and-bound and branch-and-cut algorithms for solving MILP problems. All these algorithms are well-known in the art and it is not necessary to elaborate thereon in detail here.

Computation time and computation resources are crucial factors in achieving a optimal solution to a supply chain planning problem. Unfortunately, LP problems and particularly MILP problems are sometimes extremely difficult to solve or even impossible to solve in reasonable computation times. While the number of variables involved in the problem may have an impact on the necessary computation time, it has been found that even comparatively small MILP problems (small referring to the number of variables, for example, less than one hundred) may sometimes be extremely hard to solve.

Usually, there exist several semantically equivalent models for a given problem which are not equally hard to solve. One can therefore attempt to find one of the alternatives that can be solved more easily than other alternatives.

To keep the necessary computation time and computation resources at acceptable levels, however, techniques for preprocessing LP and MILP problems have been developed that allow to transform a given planning problem into one that can be solved more efficiently. Preprocessors are known to employ two main techniques in order to achieve the preprocessing, reformulation and simplification. Reformulation means that some parts of the model are modified or exchanged by others. Reformulation is based on rules. Each rule represents one preprocessing step. By applying a rule to a model, a reformulated model is obtained that one hopes is simpler to solve. Simplification, on the other hand, is a technique that removes redundancy from the problem. Again, simplification relies on rules. Applying a rule results in a simplified model.

A preprocessor applies the different rules as long as they are applicable. The resulting model represents the preprocessed model, which is expected to require less computation time and resources to solve.

It is known to employ preprosessing techniques at the mathematical level, i.e., after a supply chain planning problem described in terms of master data and demands has been converted to a mathematical formulation. The following two articles highlight various techniques for preprocessing zero-one and mixed integer linear programming problems at the mathematical level: *Preprocessing and Probing Techniques for Mixed Integer Programming Problems* by M. W. P. Savelsbergh, ORSA Journal on Computing, Vol. 6, No. 4, Fall 1994, pp. 445-454; and *Improving LP-Representations of Zero-One Linear Programs for Branch-and-Cut* by Karla L. Hoffman and Manfred Padberg, ORSA Journal on Computing, Vol. 3, No. 2, Spring 1991, pp. 121-134.

SUMMARY OF THE INVENTION

Consistent with embodiments of the invention, methods, systems and computer-implemented architectures are provided for performing supply chain planning.

According to one object, computerized methods and systems are provided to enable efficient solving of supply chain planning problems with reasonable computation time and using reasonable computation resources.

In accordance with one embodiment, a computer-implemented architecture is provided for performing supply chain planning, the architecture comprising a database storing master data descriptive of supply chain items, a model generator coupled to the database and configured to derive a master data-based core model representative of a supply chain planning problem, and a solver configured to translate the core model into a mathematical model and determine a solution to the mathematical model. The computer-implemented architecture may also include a preprocessor configured to preprocess the core model by subjecting the core model to a set of rules to derive a preprocessed core model, wherein the solver establishes the mathematical model from the preprocessed core model.

According to an aspect of the present invention, the preprocessor may receive as an input the core model, which is described on the basis of the master data. In other words, the preprocessor operates at a level where the business logic still exists. Preprocessing the core model can improve both the core model and, implicitly, the mathematical formulation thereof. Translating the preprocessed core model to the mathematical level then results in a mathematical model that is simpler to solve than the mathematical problem that would result from the original non-preprocessed core model. In this connection, embodiments of the present invention envisage that the mathematical model itself can be additionally subjected to some form of preprocessing such as described, e.g., in the above-recited articles. Such additional preprocessing at the mathematical level, however, is a mere option and is not necessarily required when solving a supply chain planning problem using architectures consistent with the present invention.

Embodiments of the present invention may provide the further advantage that the preprocessing algorithm implemented in the preprocessor can be independent of the specific optimizer algorithm utilized in the solver for solving the mathematical problem. It is thus conceivable to use the same preprocessor for a variety of different supply chain planning modules that perform different planning tasks.

Preprocessing the core model, also, has the advantage that meaningful results at the business level can be obtained. If preprocessing is performed at the mathematical level, results may not necessarily be interpretable in a meaningful way in terms of the result of the preprocessing at the business level. Consistent with an aspect of the present invention, however, methods and systems may be provided that identify, e.g., redundant data or demands that can not be fulfilled through preprocessing the core model and report such results to the customer.

The set of rules implemented in the preprocessor may include one or more redundancy elimination rules. In addition, or as an alternative, the set of rules may include one or more remodelling rules. Elimination of redundancy and remodelling allows to reduce the size of the core model and, hence, the size of the mathematical problem. Elimination of redundancy can be achieved, e.g., by eliminating data not required for the optimization and data where there is no degree of freedom with respect to the planning decisions. A data object is not required for the optimization if the optimizer solution with this object is equal to the optimizer solution without this object with respect to the resulting planning decisions (as in procurement, production, transport, etc.). Since the core model is more expressive than the master data based model, remodelling may allow to create a simpler but equivalent model. It may also allow to create a simpler similar model if, for example, the original model contains a degree of freedom that can not be avoided, but is really not required. This is based on the principle that no more degree of freedom than required shall be included in the model.

The set of rules implemented in the preprocessor may further include one or more big number reduction rules and one or more bound reduction rules. By reducing big numbers or variable bounds in the core model, numerical stability can be improved and the linear relaxation of the problem can be strengthened. As the computations will be typically performed using finite precision floating point arithmetic, big differences in numbers may occur, which can cause badly scaled problems. Reducing the big numbers can help prevent such problems and keep differences between numbers small.

Additional objects and advantages of the invention will be set forth in part in the description which follows, and in part will be obvious from the description, or may be learned by practice of the disclosed embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Figure 1:
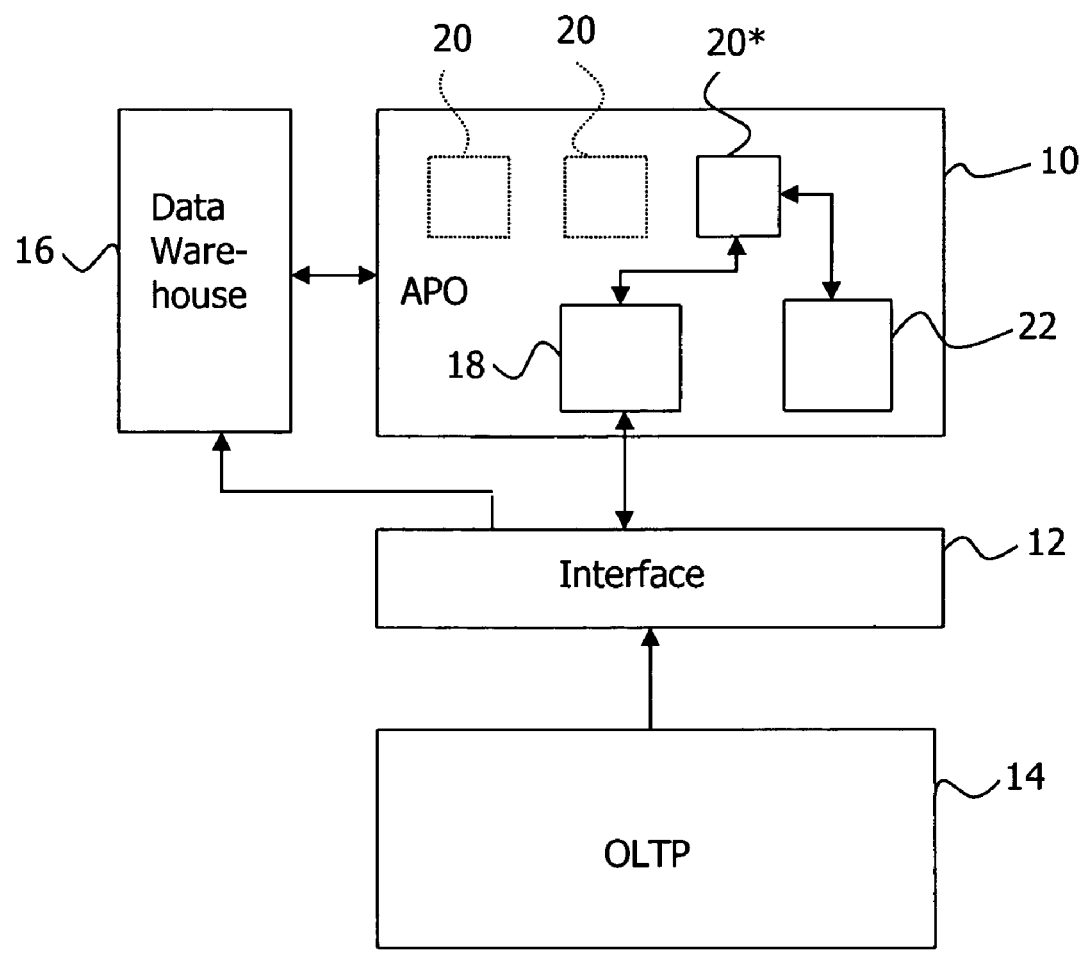
FIG. 1 is a block diagram that depicts an exemplary computer-implemented system architecture, consistent with an embodiment of the present invention, that includes a supply chain planner and optimizer module.

In the exemplary computer-implemented system architecture of FIG. 1, a supply chain planner and optimizer module is designated 10 and is linked via an interface module 12 to an online transaction processing (OLTP) module 14. The module 10 is also linked to a data warehouse module 16, as shown in FIG. 1.

In the embodiment of FIG. 1, the OLTP module 14 can be formed of, for example, an R/3 software system of SAP AG (Walldorf, Germany), but can include any other software system(s) or module(s) as well. The data warehouse module 16 can be formed of, for example, SAP AG's Business Warehouse software package, but again can be formed of other software package(s) or solution(s) as well. By way of further example, the interface module 12 can be formed of SAP AG's Core Interface (CIF) software package, although other software providing similar functions can be used as well.

The planner and optimizer module 10 can be based on SAP AG's Advanced Planner and Optimizer (APO) software system. The module 10 may include a database 18 that contains all the data relevant for a supply chain planning problem. This data specifically includes master data as exemplified above and also includes data related to demands, supplies, capacity profiles, etc. In one embodiment, the database 18 communicates with the data warehouse module 16 and the OLTP module 14 to obtain up-to-date data. It can be implemented, for example, in SAP AG's LiveCache technology.

The planner and optimizer module 10 further includes one or more planning modules 20 for performing various planning functions. One such planning function is supply network planning (SNP), which determines, based on a sales target, a short- to mid-term plan for the flow of products along the entire supply chain so as to achieve the targeted sales. At least one of the planning modules 20 may perform SNP planning. For instance, in FIG. 1, this module is discriminated by an asterisk following its reference number (i.e., 20*). The other planning modules 20 may be concerned with planning functions such as sales planning, production planning, transport planning, global availability checking and so forth.

Consistent with an aspect of the invention, the SNP planning module 20* includes a master data-based representation (or model) of the supply chain. Based on a user-defined selection, all master data relevant to a specific part of the model or the entire model is extracted along with associated transactional data. The extracted data (extracted model) is comprised of a set of relational tables. The tables are provided to a solver module 22, which has implemented therein algorithms for generating an object-oriented core model from the extracted model, preprocessing the core model at the business level, translating the preprocessed core model to the mathematical level and solving the mathematical model thus obtained. The conversion of the extracted model to the core model may take place at the business level to preserve the business semantics of the model. Decoupling the model representation in the planning module 20* and the solver 22 allows to couple different types of solvers to the planning module 20*, couple the same solver 22 to different planning modules, and implement the planning module 20* and the solver 22 using different technological platforms.

The algorithms for solving the planning problem at the mathematical level can employ linear programming techniques, such as a Simplex or branch-and-bound algorithm, for example. It is to be noted, however, that LP techniques and particularly MILP techniques are but one example of the techniques that may be used for solving mathematical models of problems in the field of supply chain planning and that other techniques known in the art can be likewise used for this purpose. Accordingly, embodiments of the present invention are not limited to LP or MILP programming techniques.

Figure 2:
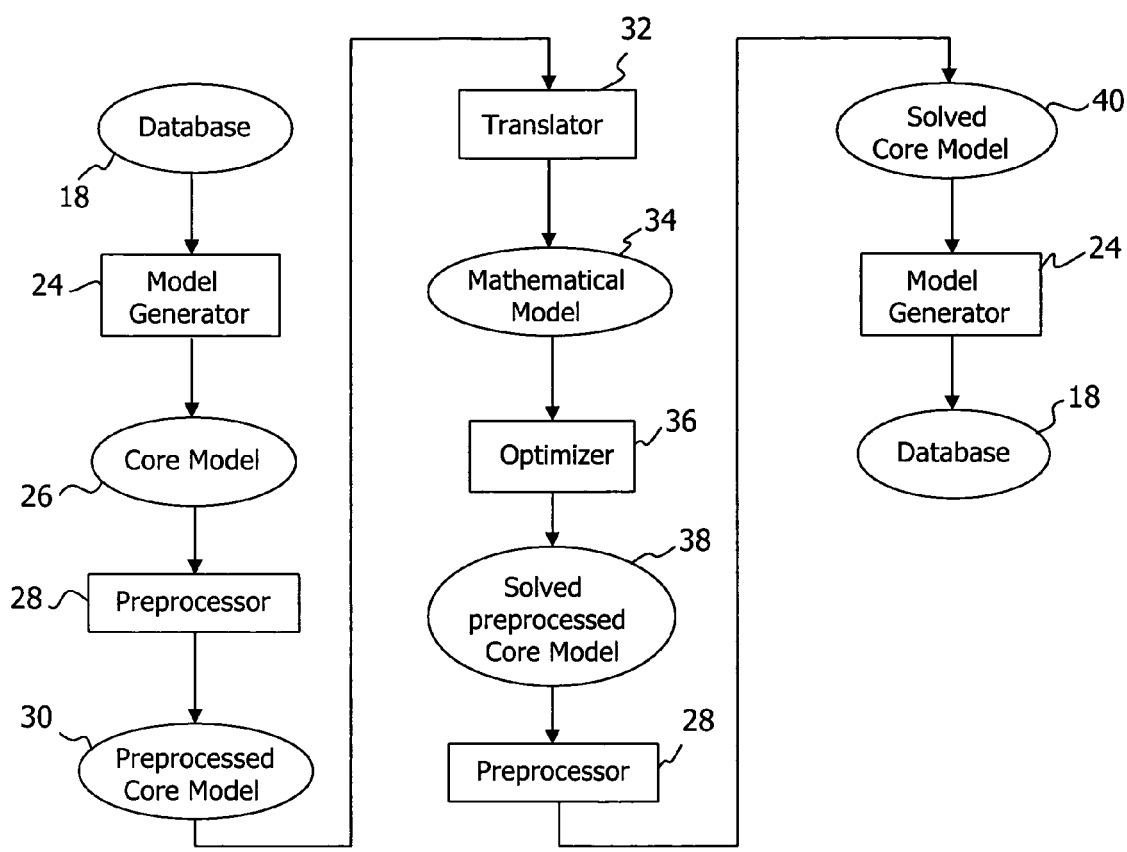
FIG. 2 illustrates a work flow of a method for optimizing and solving a supply chain planning problem, consistent with an embodiment of the present invention.

Referring to FIG. 2, a work flow is provided of an exemplary method for performing supply chain planning, consistent with an embodiment of the present invention. The exemplary method of FIG. 2 will be described with reference to the computer-implemented architecture of FIG. 1.

As shown in FIG. 2, a model generator 24 builds an object-oriented model (core model 26) from a solver-independent, table-based planning model using master data items, such as location, lane, product, resource, PPM, etc., from the database 18. A preprocessor 28 receives the master data-based core model 26 and applies a set of preprocessing rules to create a preprocessed core model 30. The preprocessed core model 30 is an improved representation of the core model 26 at the same level, i.e., the business level.

A translator 32 may then translate the preprocessed core model 30 into a mathematical model 34, which is subsequently solved by an optimizer 36. In one embodiment, the translator 32 describes the mathematical model 34 in terms of variables, inequalities and objective functions. Following the optimizer 36, a solved preprocessed core model 38 is obtained, which may be postprocessed by the preprocessor 28 to generate a solved core model 40. The solved core model 40 may subsequently be fed back to the database 18 via the model generator 24. In one embodiment, the model generator 24, preprocessor 28, translator 32 and optimizer 36 are all implemented in the solver module 22. Any suitable combination of hardware, software and/or firmware may be used for this purpose.

In a preferred embodiment, the rules applied by the preprocessor 28 for preprocessing the core model 26 can be classified into three categories: (i) rules for eliminating redundancy, (ii) rules for improving the numerical properties and linear relaxation, and (iii) rules for remodelling. In the following description, a more detailed explanation of exemplary rules from each of these categories will be given.

Exemplary Rules for Redundancy Elimination

The size of the problem may have a major impact on the performance of the optimization process in terms of storage consumption and solving speed. Rules for eliminating redundancy may aim at identifying and eliminating parts of the planning problem that have no influence on the result of the optimization.

In one embodiment, a first redundancy elimination rule checks the supply chain (better: the core model) for location products and dependent objects that can be eliminated from the core model.

Generally, an optimized plan for a supply chain planning problem may aim at planning production, transport and procurement orders such that all demands and all safety stocks can be met under given restrictions (e.g., finite capacities). It has been found that a planning problem often-times involves location products as defined above for which no demands or safety stock requirements exist. As a consequence, all elements of the supply chain necessary to meet a potential demand of such a product are redundant unless these elements are at the same time necessary to fulfil an actually existing demand for another product.

According to a first preprocessing rule, the supply chain is analyzed for each location product. If any location products are found for which no demands and safety stock requirements exist, these location products are eliminated along with any dependent portions of the model which need not be utilized (as they are not needed for meeting a demand).

Figure 3:
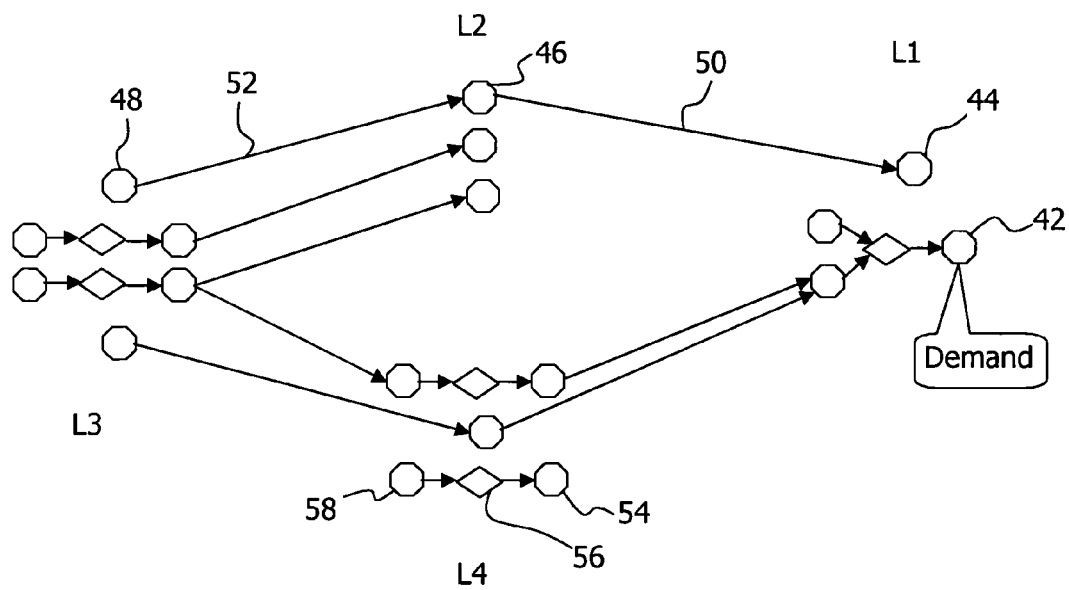
FIGS. 3, 4, 5 and 6 illustrate exemplary scenarios for the application of redundancy elimination and remodelling rules, consistent with embodiments of the present invention.

FIG. 3 illustrates the first preprocessing rule by way of a simple example. In FIG. 3, a portion of a supply chain is illustrated which includes: production process models represented by a lozenge symbol, products represented by an octagon symbol, and transport lanes represented by an arrow. In the scenario illustrated in FIG. 3, a demand exists for a product 42 at a location L1. On the other hand, no demand exists for a product 44 at the same location L1. Accordingly, the supply chain section shown in FIG. 3 is checked whether or not the location product (44, L1) (i.e., product 44 at location L1) can be eliminated. To this end, the supply chain section is back-propagated from the location product (44, L1) to identify any supply chain items that are exclusively used for providing the product 44 at location L1. By so doing, it is found that the following supply chain items solely depend on the location product (44, L1): a product 46 at a location L2, a product 48 at a location L3 and transport lanes 50, 52 between locations L2 and L1 and between locations L3 and L2, respectively. All these supply chain items, i.e., items 44, 46, 48, 50 and 52, can be eliminated from the supply chain section shown in FIG. 3, thus simplifying the core model to be solved.

Furthermore, when checking the supply chain section of FIG. 3, a product 54 at a location L4 will also be identified as not being required for providing the product 42. The product 54 is output from a production process model 56, which receives a product 58 as an input product. As the supply chain items 54, 56, 58 are not necessary to fulfil the demand with respect to the product 42, they can also be eliminated from the supply chain.

As demonstrated by the example of FIG. 3, the supply chain can be streamlined by eliminating location products not required for demand or safety stock satisfaction and also eliminating any dependent lanes, locations, lane locations and activities (such as procurement, transport, PPM).

Redundancy elimination, as discussed by the example above, is based on a demand perspective (pull). It is to be understood though that redundancy can also be eliminated in the planning problem through application of a stock-related perspective (push). This means that any potential stock is analyzed as to where it can be "pushed" in the supply chain. Any productions, transports and involved location products in the push route or routes must not be eliminated.

In accordance with another embodiment, a second redundancy elimination rule may be provided that aims to eliminate resources.

In general, resources constitute capacity restrictions. If a capacity restriction limits a single planning decision only, it is easier for the subsequent optimization to express this limitation in terms of a reduced definition range of the variable representing the planning decision. The second redundancy rule may check all resources for this property and eliminate those with the property after limiting the definition range of the variable accordingly.

Figure 4:
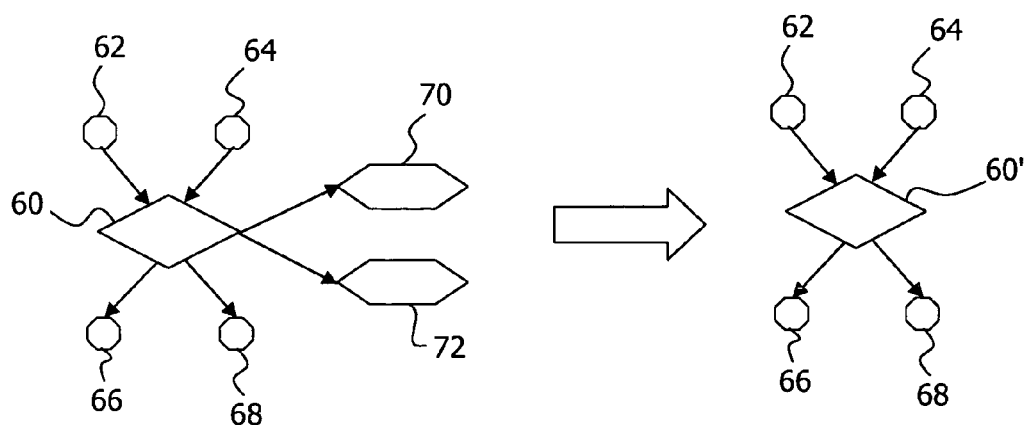

FIG. 4 illustrates example of the application of the second rule. In FIG. 4, a production process model 60 receives input products 62, 64 and delivers output products 66, 68. In order to produce the output products 66, 68, the PPM 60 utilizes resources 70, 72, which are indicated by a flattened hexagon symbol. The resources 70, 72 are exclusively utilized by the PPM 60. No other planning decisions rely on the resources 70, 72. In this case, the capacities represented by the resources 70, 72 can be propagated to the PPM 60 by adapting upper bounds within the PPM 60 correspondingly. The resources 70, 72 can then be deleted. The modified PPM thus obtained is designated 60' in FIG. 4. As can be seen, the elimination of the resources 70, 72 simplifies the model and can improve the performance of the optimizer at the mathematical level.

Exemplary Rules for Improving Numerical Properties and Linear Relaxation

Linear programming involves the solving of a system of linear equalities or inequalities. Owing to the floating point arithmetic of computers, which provides a finite accuracy only, rounding or cancellation problems may occur during solving of the equalities or inequalities. Such problems are less likely to occur if the range of numbers involved in the optimization problem is kept small. Rules may therefore be provided that aim at reducing big numbers, provided such reduction does not alter the set of admissible solutions.

To this end, consistent with an embodiment of the invention, a third preprocessing rule may be provided that relates to the elimination of demands and safety stocks.

The satisfaction of a demand is a so-called soft constraint in the mathematical model on which the optimization is based. This means that the constraint may be violated at the expense of a penalty cost in the objective function. This may be necessary since it may not be guaranteed that all demands or safety stocks can be met (e.g., due to a shortage in capacity). Usually, big numbers (e.g., values in the range of $10^6$-$10^8$) are used as penalty cost in the objective function. It is a purpose of the third preprocessing rule to identify any demands or safety stocks that can not be satisfied with certainty. In this case, the demands and the correspondingly big penalty cost can be eliminated from the objective function.

In accordance with another embodiment, a fourth preprocessing rule may be implemented that is concerned with the reduction of big M numbers.

Big M modelling is a conventionally utilized technique for modelling minimal lot sizes, fixed resource consumption or fixed costs. In the technique of big M modelling, a variable Z, which can only assume the value 0 or 1, is combined with a random variable X such that Z=1 for X>0 and Z=0 for X=0.

To give an example, a production process will be often-times considered useless unless a certain minimal amount (minimal lot size) can be produced. In the mathematical model, this constraint can be modelled as follows:

$$l \cdot Z \leq X$$

$$X \leq M \cdot Z$$

where X is a variable representing the produced amount, Z is an indicator variable that either assumes the value 0 or the value 1, I is a constant representative of a minimal lot size (e.g., 100), and M is a big number so defined that it does not limit X ("big M" constant).

According to the range of values for Z:

$$Z=0: I \cdot 0 \leq X \leq M \cdot 0 \rightarrow X=0$$

$$Z=1: I \cdot 1 \leq X \leq M \cdot 1 \rightarrow I \leq X \leq M$$

Thus, the produced amount is either zero (X=0) or corresponds to at least the minimal lot size I ($I \leq X \leq M$).

The fourth rule aims to select the constant M as small as possible, but big enough so as not to limit X. To this end, the rule examines other constraints involving the variable X to derive a maximum value for X so that no violation of the constraints occurs. Examples for such other constraints are capacity restrictions of production resources or material availability restrictions (e.g., stock-restricted production).

Consistent with yet another embodiment, a fifth preprocessing rule may be provided that relates to the adaptation of lot sizes for procurement.

The procurement of raw materials is at the beginning of a supply chain. Frequently, large amounts of raw materials are present in supply chains that have a converging product flow. As an example, a large number of screws may be required for manufacturing a complex machine. In the mathematical model, the corresponding variable may easily assume a very high value. If, as an example, the procurement of the product is subject to a piecewise linear cost function (such as for modelling a grading of rebates), this will be modelled by a "big M" structure at the mathematical level. For this purpose, the constant M, again, must be estimated as explained above in connection with the fourth rule. In view of the fact that procurement values may become very large, the big M constant must be selected correspondingly large. This can lead to numerical problems. The rule therefore aims at reducing the value of the procurement variable in the mathematical model so as to be able to reduce the big M constant. To this end, the rule defines a procurement lot size, which is greater than 1. If, for example, one million items of a product are to be procured, the value of the procurement variable would be 1.000.000 without application of the fifth rule. On the other hand, if a lot size of, e.g., 1.000 items is defined in accordance with the fifth rule, the value of the procurement variable would be 1.000 only since the optimizer would now work on multiples of the lot size 1.000.

Exemplary Rules for Remodelling

In many cases, several alternative models exist for representing a supply chain. While the alternative models may be "equivalent" in a logical sense, there may be differences with respect to the efficiency with which the models can be solved. Thus, one would prefer a model that is easier to solve than others.

In accordance with another embodiment, a sixth rule and a seventh rule may be provided that target at simplifying or reducing the problem by remodelling the same. The basic idea is as follows: If it is possible to directly derive a dependent decision from a planning decision, the dependent decision can be removed from the model since it can always be reconstructed from the superordinate decision.

The sixth rule relates to the reduction of supplier locations. Suppliers, which may, e.g., deliver a raw material, are represented directly as a location in many supply chain models and are connected to the production locations by a transport link. When optimizing the supply chain model, variables representing stock at the supplier and the transport to the production location will then have to be provided. In many cases, however, the supplier's stock is always zero because there may be no reason to build up a stock, e.g., if no capacity restrictions are modelled for the supplier. Further, the transport to the production location can always be derived from the demand and the time of demand of the raw product at the production location. In the mathematical model, the variables that represent the supplier location and the transport relationship can be saved if a direct possibility of "producing" the raw product at the production location is modelled rather than an explicit supplier location. The sixth rule may perform this kind of preprocessing.

Figure 5:
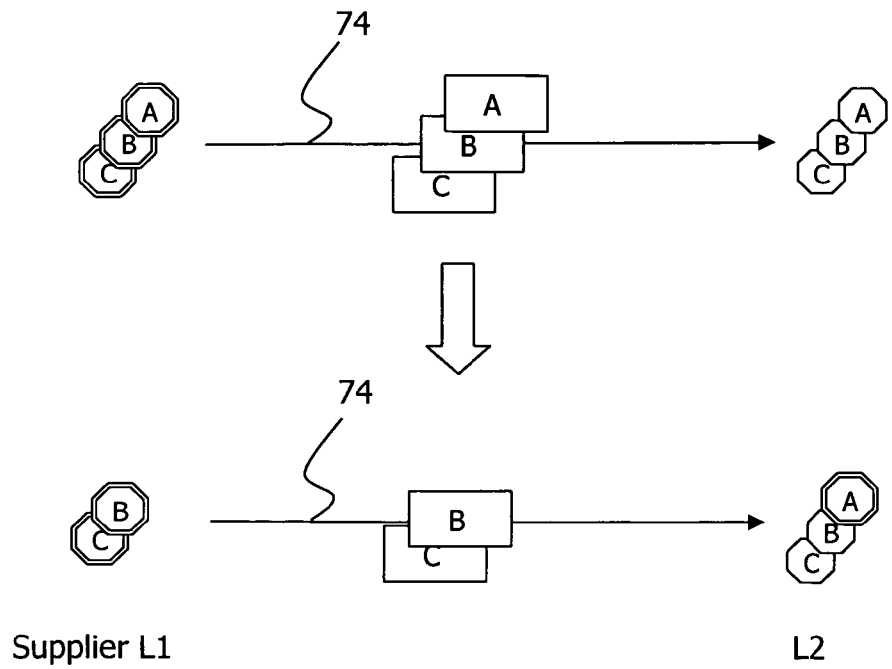

An example of the application of the sixth rule is illustrated in FIG. 5. The upper portion of FIG. 5 shows a supplier location L1, at which products A, B, C are produced. The products A, B, C are transported to a location L2 as indicated by a transport arrow 74. According to the sixth rule, the supplier location L1 can be removed if all products produced at this location can be removed. The lower portion of FIG. 5 illustrates the situation after removal of the product A from the supplier location L1. In the lower portion of FIG. 5, the product A is shown as being "produced" at location L2. As there is a direct relationship between the production of the product A at the supplier location L1, the transport of the product A and its demand at location L2, the supply chain can be remodelled by assuming that the product A is produced directly at the location L2. In the example shown in FIG. 5, the same direct dependency between the procurement at location L1 and the demand at location L2 also exists for the products B and C. Accordingly, the supplier location L1 can be entirely removed and also the transport connection 74 can be removed from the supply chain model.

The seventh rule relates to the reduction of customer locations. As with suppliers, many supply chain models represent customers using explicit customer locations. Again, stock at the customer and the transport of the products to the customer must be modelled at the mathematical level. In a case where there is a single location only from which a customer is provided with a certain product, it is more efficient to propagate the customer demand to this location and remove the customer location along with the transport connection. It is this kind of preprocessing that may be achieved by the seventh rule.

Figure 6:
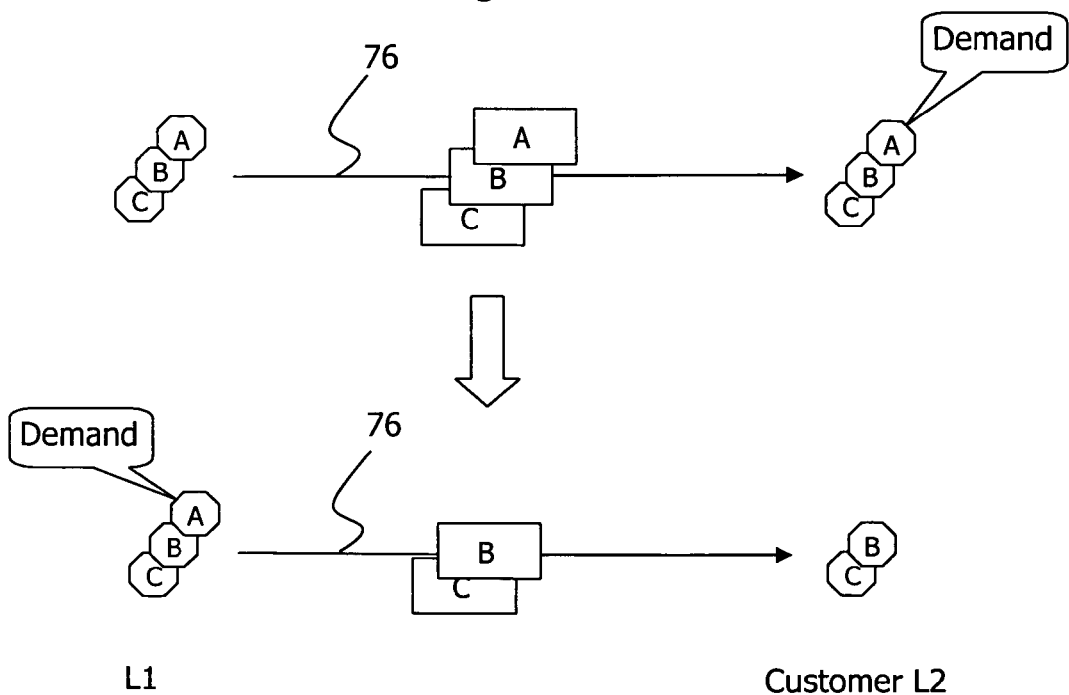

An example of the application of the seventh rule is illustrated in FIG. 6. The upper portion of FIG. 6 shows a scenario where products A, B, C are delivered from a location L1 via a transport path 76 to a customer location L2 to satisfy a corresponding demand. If the demand for, say, product A is exclusively satisfied from the location L1, this demand can be back-propagated from the customer location L2 to the providing location L1. Product A can then be eliminated at the customer location L2. This scenario is illustrated in the lower portion of FIG. 6. If every demand at the customer location L2 is satisfied by a respective single previous location, all demands can be back-propagated as is shown in FIG. 6 and the entire customer location L2 can be removed.

As will be appreciated, the above explained remodelling rules allow to simplify the core model of the supply chain planning problem and enhance the performance of the optimizer at the mathematical level.

The computational aspects described herein can be implemented in digital electronic circuitry, or in computer hardware, firmware; software, or in any combination thereof. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

Embodiments of the invention may also be implemented in an article of manufacture with a computer usable medium having computer readable instructions embodied therein for providing access to resources available on that computer, the computer readable instructions comprising instructions to cause the computer to perform any part or steps of methods according to the invention. Embodiments of the invention may also be implemented as a computer program for running on a computer system, at least including code portions for performing steps of methods according to the invention when run on a computer system or enabling a general propose computer system to perform functions of a filter device consistent with embodiments of the invention. Such a computer program may be provided on a data carrier, such as a CD-ROM or diskette, stored with data loadable in a memory of a computer system, the data representing the computer program. The data carrier may further include a data connection, such as a telephone cable or a wireless connection transmitting signals representing a computer program according to the invention.

While the invention has been described with reference to specific embodiments, those skilled in the art will understand that various changes may be made and equivalents may be substituted without departing from the scope of the invention. For instance, one or more of the steps of the disclosed methods may be deleted, rearranged, substituted or otherwise modified. In addition, many modifications may be made to adapt a particular step or structure to the teachings of the invention without departing from its scope.

Therefore, it is intended that the invention not be limited to the particular embodiments disclosed herein, but that the invention will include all embodiments falling within the scope of the appended claims.

What is claimed is:

1. A computer system for performing supply chain planning, the computer system comprising:
   a processor;
   a memory;
   a database storing data descriptive of supply chain items;
   a model generator coupled to the database and configured to derive a model based on the data and representative of a supply chain planning problem;
   a preprocessor configured to subject the model to a set of rules to derive a preprocessed model;
   a translator configured to transform the preprocessed model into a mathematical model; and
   an optimizer configured to determine a solution of the mathematical model.

2. The computer system of claim 1, wherein the set of rules comprise one or more redundancy elimination rules.

3. The computer system of claim 1, wherein the set of rules comprise one or more remodelling rules.

4. The computer system of claim 1, wherein the set of rules comprise one or more big number reduction rules.

5. The computer system of claim 1, wherein the set of rules comprise one or more bound reduction rules.

6. A computer-implemented method for performing supply chain planning, the method comprising:
   storing, in a database, data descriptive of supply chain items;
   deriving, with a model generator coupled to the database, a model based on the data and representative of a supply chain planning problem;
   preprocessing, by a processor, the model by subjecting the model to a set of rules to derive a preprocessed model;
   transforming the preprocessed model into a mathematical model; and
   determining a solution of the mathematical model.

7. The computer-implemented method of claim 6, wherein the set of rules comprise one or more redundancy elimination rules.

8. The computer-implemented method of claim 6, wherein the set of rules comprise one or more remodelling rules.

9. The computer-implemented method of claim 6, wherein the set of rules comprise one or more big number reduction rules.

10. The computer-implemented method of claim 6, wherein the set of rules comprise one or more bound reduction rules.

11. A tangible computer-readable medium storing a program which, when executed by a processor, performs a method of supply chain planning, the method comprising:
    storing data descriptive of supply chain items;
    deriving, based on the stored master data, a model based on the data and representative of a supply chain planning problem;
    preprocessing the model by subjecting the model to a set of rules to derive a preprocessed model;
    transforming the preprocessed model into a mathematical model; and
    determining a solution of the mathematical model.

12. The tangible computer-readable medium of claim 11, wherein the set of rules comprise one or more redundancy elimination rules.

13. The tangible computer-readable medium of claim 11, wherein the set of rules comprise one or more remodelling rules.

14. The tangible computer-readable medium of claim 11, wherein the set of rules comprise one or more big number reduction rules.

15. The tangible computer-readable medium of claim 11, wherein the set of rules comprise one or more bound reduction rules.

16. The computer system of claim 1, wherein the set of rules improve efficiency of solving the supply chain planning problem using the mathematical model.

17. The computer system of claim 16, wherein improved efficiency comprises reduction of computation time and computation resources necessary to solve the supply chain planning problem by reducing a size of the mathematical model.

18. The computer system of claim 2, wherein the one or more redundancy elimination rules comprise a first rule for eliminating location products and dependent objects from the core model and a second rule for eliminating resources from the core mode.

19. The computer system of claim 17, wherein the first rule for eliminating location products eliminates a product location when no demand exists for a product at a location.

20. The computer system of claim 3, wherein the one or more remodelling rules comprise a third rule for reducing supplier locations from the core model and a fourth rule for reducing customer from the core model.

* * * * *